(12) United States Patent
Scolnicov et al.

(10) Patent No.: US 9,053,519 B2
(45) Date of Patent: Jun. 9, 2015

(54) SYSTEM AND METHOD FOR ANALYZING GIS DATA TO IMPROVE OPERATION AND MONITORING OF WATER DISTRIBUTION NETWORKS

(75) Inventors: Haggai Scolnicov, Tel Aviv (IL); Amitai Armon, Tel Aviv (IL); Chaim Linhart, Petach Tikva (IL); Lilach Bien, Rehovot (IL)

(73) Assignee: TAKADU LTD., Yehud (IL)

( * ) Notice: Subject to any disclaimer, the term of this patent is extended or adjusted under 35 U.S.C. 154(b) by 212 days.

(21) Appl. No.: 13/371,911

(22) Filed: Feb. 13, 2012

(65) Prior Publication Data
US 2013/0211797 A1 Aug. 15, 2013

(51) Int. Cl.
*G06F 17/10* (2006.01)
*G06Q 50/06* (2012.01)
*G06Q 10/06* (2012.01)

(52) U.S. Cl.
CPC ............ *G06Q 50/06* (2013.01); *G06Q 10/0639* (2013.01)

(58) Field of Classification Search
CPC ............................ G06Q 50/06; G06Q 10/0639
USPC ............................................................. 703/2
See application file for complete search history.

(56) References Cited

U.S. PATENT DOCUMENTS

| | | | |
|---|---|---|---|
| 4,361,030 A | 11/1982 | Heide | |
| 4,407,158 A | 10/1983 | Petroff | |
| 4,712,182 A | 12/1987 | Wakamori et al. | |
| 4,796,466 A | 1/1989 | Farmer | |
| 4,797,621 A | 1/1989 | Anderson et al. | |
| 5,301,538 A | 4/1994 | Recla | |
| 5,315,529 A | 5/1994 | Farmer | |
| 5,546,789 A | 8/1996 | Balke et al. | |
| 5,708,195 A | 1/1998 | Kurisu et al. | |
| 5,756,880 A | 5/1998 | Chen et al. | |
| 5,883,815 A | 3/1999 | Drakulich et al. | |

(Continued)

FOREIGN PATENT DOCUMENTS

| | | |
|---|---|---|
| DE | 102008048748 | 9/2008 |
| EP | 0298479 | 7/1988 |

(Continued)

OTHER PUBLICATIONS

U.M. Shamsi, "GIS Applications for Water, Wastewater, and Stormwater Systems," 2005, Taylor & Francis, 48 pages.*

(Continued)

*Primary Examiner* — Dwin M Craig
*Assistant Examiner* — Russ Guill
(74) *Attorney, Agent, or Firm* — Seth H. Ostrow, Esq.; Meister Seelig & Fein LLP

(57) ABSTRACT

A computerized method for modeling a utility network. The method includes retrieving geographical information system (GIS) data, asset management data, and sensor archive data of one or more assets of the utility network. The method also includes generating one or more mathematical elements from the one or more assets and creating probable connections between the one or more mathematical graph elements based on the GIS and asset data. A mathematical graph is generated based on the probable connections, the mathematical graph including one or more asset characteristics of the one or more assets. Analysis is performed on the utility network using the mathematical graph and the mathematical graph data is stored for use by other systems within the utility network.

27 Claims, 7 Drawing Sheets

(56) References Cited

U.S. PATENT DOCUMENTS

| | | | |
|---|---|---|---|
| 6,067,477 | A | 5/2000 | Wewalaarachchi et al. |
| 6,336,131 | B1 | 1/2002 | Wolfe |
| 6,477,434 | B1 | 11/2002 | Wewalaarachchi et al. |
| 6,526,358 | B1 | 2/2003 | Mathews, Jr. et al. |
| 6,687,637 | B2 | 2/2004 | Garabedian |
| 6,691,724 | B2 | 2/2004 | Ford |
| 6,829,566 | B2* | 12/2004 | Sage ............................ 702/183 |
| 6,845,336 | B2 | 1/2005 | Kodukula et al. |
| 6,862,540 | B1 | 3/2005 | Welch et al. |
| 6,963,808 | B1 | 11/2005 | Addink et al. |
| 6,970,808 | B2 | 11/2005 | Abhulimen et al. |
| 6,985,779 | B2 | 1/2006 | Hsiung et al. |
| 6,985,831 | B2 | 1/2006 | Ito et al. |
| 6,993,403 | B1 | 1/2006 | Dadebo et al. |
| 6,995,846 | B2 | 2/2006 | Kalayeh et al. |
| 7,054,799 | B1* | 5/2006 | Hartell et al. ...................... 703/2 |
| 7,107,280 | B2* | 9/2006 | Tomic et al. .................. 707/783 |
| 7,119,698 | B2 | 10/2006 | Schleich et al. |
| 7,135,956 | B2 | 11/2006 | Bartone et al. |
| 7,228,726 | B2 | 6/2007 | Kates |
| 7,233,876 | B2 | 6/2007 | Halstead et al. |
| 7,263,459 | B2 | 8/2007 | Ito et al. |
| 7,283,913 | B2 | 10/2007 | Garnaes |
| 7,310,590 | B1 | 12/2007 | Bansal |
| 7,330,796 | B2 | 2/2008 | Addink et al. |
| 7,412,876 | B2 | 8/2008 | Kates |
| 7,424,399 | B2 | 9/2008 | Kahn et al. |
| 7,437,267 | B2 | 10/2008 | Oka et al. |
| 7,504,964 | B2 | 3/2009 | Brennan et al. |
| 7,523,016 | B1 | 4/2009 | Surdulescu et al. |
| 7,526,944 | B2 | 5/2009 | Sabata et al. |
| 7,529,644 | B2 | 5/2009 | Lenz et al. |
| 7,536,371 | B2 | 5/2009 | Hartman et al. |
| 7,558,703 | B2 | 7/2009 | Stoupis et al. |
| 7,558,771 | B2 | 7/2009 | Barajas et al. |
| 7,587,481 | B1 | 9/2009 | Osburn, III |
| 7,647,136 | B2 | 1/2010 | McDowell |
| 7,669,461 | B2 | 3/2010 | Kates |
| 7,670,494 | B2 | 3/2010 | Frank |
| 7,680,611 | B2 | 3/2010 | Guidi et al. |
| 7,698,073 | B2 | 4/2010 | Wolfe |
| 7,720,615 | B2 | 5/2010 | Kim |
| 7,739,004 | B2 | 6/2010 | Johnson |
| 7,793,188 | B2 | 9/2010 | Mukhopadhtat et al. |
| 7,844,419 | B1* | 11/2010 | Gurrieri et al. ................... 703/1 |
| 7,920,983 | B1* | 4/2011 | Peleg et al. .................... 702/100 |
| 8,639,483 | B1* | 1/2014 | Walski et al. ...................... 703/9 |
| 2002/0116282 | A1 | 8/2002 | Martin et al. |
| 2003/0033117 | A1* | 2/2003 | Sage ............................ 702/182 |
| 2003/0101009 | A1 | 5/2003 | Seem |
| 2004/0148113 | A1* | 7/2004 | Sage .............................. 702/51 |
| 2005/0190074 | A1 | 9/2005 | Cumeralto et al. |
| 2005/0246112 | A1 | 11/2005 | Abhulimen et al. |
| 2006/0179463 | A1 | 8/2006 | Chisholm et al. |
| 2007/0016399 | A1 | 1/2007 | Gao et al. |
| 2007/0083398 | A1 | 4/2007 | Ivey et al. |
| 2007/0203860 | A1 | 8/2007 | Golden et al. |
| 2007/0219728 | A1 | 9/2007 | Papageorgiou et al. |
| 2007/0233397 | A1 | 10/2007 | Kim |
| 2007/0247331 | A1 | 10/2007 | Angelis et al. |
| 2007/0288200 | A1 | 12/2007 | Guidi et al. |
| 2008/0109175 | A1 | 5/2008 | Michalak |
| 2008/0168339 | A1 | 7/2008 | Hudson et al. |
| 2008/0250497 | A1 | 10/2008 | Mullarkey et al. |
| 2008/0300834 | A1* | 12/2008 | Wiemer et al. ..................... 703/2 |
| 2009/0299660 | A1 | 12/2009 | Winter |
| 2009/0327071 | A1* | 12/2009 | Kreft .......................... 705/14.49 |
| 2010/0169477 | A1 | 7/2010 | Stienhans et al. |
| 2011/0191267 | A1* | 8/2011 | Savic et al. ................... 705/412 |

FOREIGN PATENT DOCUMENTS

| | | |
|---|---|---|
| EP | 0521548 | 1/1993 |
| EP | 0821817 | 6/1999 |
| EP | 1047925 | 3/2004 |
| EP | 0925491 | 5/2004 |
| EP | 1324165 | 11/2007 |
| EP | 1867970 | 12/2007 |
| EP | 1133690 | 11/2008 |
| EP | 2060896 | 5/2009 |
| GB | 2478432 | 3/2011 |
| KR | 1020080005694 | 1/2008 |
| TW | 439028 | 6/2001 |
| TW | 200713114 | 4/2007 |
| WO | 0020832 | 4/2000 |
| WO | 0194937 | 12/2001 |
| WO | 0195227 | 12/2001 |
| WO | 0245315 | 6/2002 |
| WO | 02086670 | 10/2002 |
| WO | 2004113863 | 12/2004 |
| WO | 2005094493 | 10/2005 |
| WO | 2007002838 | 1/2007 |
| WO | 2008016697 | 2/2008 |
| WO | 2008029681 | 3/2008 |
| WO | 2008067442 | 6/2008 |
| WO | 2008094551 | 8/2008 |
| WO | 2009055342 | 4/2009 |
| WO | 2010035281 | 4/2010 |

OTHER PUBLICATIONS

"Thames Water Utilities," 2007, 259 pages.*
Alexandru Aldea et al., "Network modeling solution for water supply using GIS concepts," 2008, Conferinta international: "Solutii pentru sisteme de alimentaire cu apa si canalizare in localitati pana la 10000 locuitori," pp. 202-208.*
"GIS Implementation for Water and Wastewater Treatment Facilities," 2005, Water Environment Federation, pp. 81-107.*
S. S. Skiena, "The Algorithm Design Manual," 2008, second edition, Springer-Verlag, pp. 145-190, 475-522, 523-561.*
Judith L. Gersting, "Mathematical structures for computer science," sixth edition, 2007, W.H. Freeman and Company, pp. 520-527.*
"Water Infrastructure Monitoring," 2010, Wayback Machine entry for http://www.takadu.com/files/Brochure/TaKaDuOnePager.pdf, two pages.*
Samir Khuller et al., "Fault tolerant K-center problems," 2000, Theoretical Computer Science, vol. 242, pp. 237-245.*
Ines Slama et al. "Energy efficient scheme for large scale wireless sensor networks with multiple sinks," 2008, IEEE Wireless Communications and Networking Conference 2008, pp. 2367-2372.*
"NetworkX GIS Shapefile," 2011, http://networkx.lanl.gov/reference/readwrite.nx__shp.html, one page.*
Bin Jiang et al., "Topological analysis of urban street networks," 2004, Environment and Planning B: Planning and design, vol. 31, pp. 151-162.*
Alireza Yazdani et al., "Complex network analysis of water distribution systems," Apr. 2011, arXiv, pp. 1-11.*
Lina Perelman et al., "Topological clustering for water distribution systems analysis," available online Feb. 15, 2011, Environmental Modelling & Software, vol. 26, pp. 969-972.*
Danilo Mandic, et al. "Data Fusion for Modern Engineering Application: An Overview", ICANN 2005, LNCS 3697, pp. 715-721 (2005).
Sholom M. Weiss and Nitin Indurkhya. Predictive Data Mining: A Practical Guide. Morgan Kaufmann, 1997, p. 147.
ABB Group (2009) "Solutions for the Water Cycle Leakage Management", ABB Water Industrial Sector Initiative, 26 slides (pages); state retrieved from http://www.abb.com/industries/db0003db004063/a0a4683761017bb2c12574bb002be3b5.aspx.
Stephen Mounce, et al. (2006) "Burst Detection Using Hydraulic Data From Water Distribution Systems With Artificial Neural Networks", Urban Water Journal, pp. 12 pages, UK.
Dalius Misiunas (2005) "Failure Monitoring and Asset Condition Assessment in Water Supply Systems", Doctoral Dissertation in Industrial Automation Department of Industrial Electrical Engineering an Automation, Lund University, Sweden, 349 pages.
Centre for Water Systems: A Leading Center for Water Engineering Research in the UK. vol. II, Issue 2, Autumn 2009 <http://centres.exeter.ac.uk/cws/downloads/doc__download/53-cws-newsletter-volume-2-issue-2>.

(56) References Cited

OTHER PUBLICATIONS

Frenk Withoos, et al. (2004) "Leak Manager, Analysis and Management of Water Leakage in Potable Water Distribution Networks Using Advise IT Water Leakage Management", ABB Review, Innovative Engineering, pp. 61-63; state retrieved from http://www.abb.com/industries/db0003db004063/a0a4683761017bb2c12574bb002be3b5.aspx.

Ivan Stoianov, et al. (2007) Pipenet: A Wireless Sensor Network for Pipeline Monitoring, In IPSN07: 264-273. ACM, 2007, USA, 10 pages.

Gabrys, B. and Bargiela, A. "Simulation of Water Distribution Systems". In: The European Simulations Symposium (ESS'98), Oct. 26-28, 1998, Nottingham, UK, pp. 273-277.

Mamlock, R. and Al-Jayyousi, O. "Fuzzy Sets Analysis for Leak Detection in Infrastructure Systems: A Proposed Methodology". In: Clean Technology Environmental Policy 6, pp. 26-31, 2003.

\* cited by examiner

SYSTEM AND METHOD FOR ANALYZING GIS DATA TO IMPROVE OPERATION AND MONITORING OF WATER DISTRIBUTION NETWORKS

CROSS REFERENCE TO RELATED APPLICATIONS

The present application is related to:
U.S. patent application Ser. No. 12/717,944, entitled "SYSTEM AND METHOD FOR MONITORING RESOURCES IN A WATER UTILITY NETWORK," filed on Mar. 5, 2010, now issued as U.S. Pat. No. 7,920,983;
U.S. patent application Ser. No. 13/008,819, entitled "SYSTEM AND METHOD FOR IDENTIFYING LIKELY GEOGRAPHICAL LOCATIONS OF ANOMALIES IN A WATER UTILITY NETWORK," filed on Jan. 18, 2011; and
U.S. patent application Ser. No. 13/313,261, entitled "SYSTEM AND METHOD FOR IDENTIFYING RELATED EVENTS IN A RESOURCE NETWORK MONITORING SYSTEM," filed on Dec. 7, 2011;
the disclosures of which are hereby incorporated herein by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates the field of monitoring and operating resource distribution networks such as utility water distribution networks and, in particular, to analyzing and using GIS data to improve resource network operation and monitoring.

BACKGROUND OF THE INVENTION

The United Nations notes that water use has been growing at more than twice the rate of population increase in the last century, and an increasing number of regions are chronically short of water. By 2025 two-thirds of the world's population could be under water stress conditions as a result of population growth and other factors. Water, especially potable water, is essential for all socio-economic developments and for maintaining a healthy population. As populations increase across the globe they call for an increased allocation of clean water for use, resulting in increased water scarcity.

A significant amount of water may be conserved merely by addressing the loss of water or degradation in water quality in systems caused by leaks or other adverse effects. Thus, one method of addressing water scarcity and conserve resources is to improve the operation and monitoring of the utility networks used to deliver water, such as by faster and more accurate detection of leaks and other events occurring in such networks. Several systems currently exist to facilitate improved network monitoring in water utility networks. For example, commonly owned U.S. Pat. No. 7,920,983, entitled "SYSTEM AND METHOD FOR MONITORING RESOURCES IN A WATER UTILITY NETWORK" which is herein incorporated by reference in its entirety, describes sophisticated systems and methods for detecting anomalies in water utility networks using statistical and analytical techniques, some of which are in use by the assignee of the present invention, TaKaDu Ltd. Other systems available from other companies, such as those available from ABB Group or IBM Corp., also provide some improvements to anomaly detection in water utility networks.

One way in which the operation and monitoring of water utility networks may be further improved is by making better use of data from Geographical Information Systems ("GIS"s or "GIS systems") and asset management systems. As known to those of skill in the art, a GIS integrates, stores, and displays geographic information about a network or system laid out in a physical environment. Applications using GIS allow users to create interactive queries, review spatial information, edit data and maps, and present the results of these operations in a graphical user interface. Further description and details of GIS systems may be found in "Getting Started with Geographic Information Systems," Second Edition by Keith C. Clarke, which is hereby incorporated by reference in its entirety. As is also known to those of skill in the art, asset management systems store information about physical components of a network or system such as a water utility network, such as pipes or joints, and are used in the operation and management of networks such as in fixing network components or in ordering new or replacement components. Commercially available asset management systems used to manage water utility network assets are available from a variety of entities, as known to those of skill in the art.

Water utilities (or other network operators) currently use data from GIS and asset management systems to display the physical layout of their distribution networks and identify characteristics of individual assets in the networks. Often times, GIS data is merely displayed and not used for automated analysis and functions. The usage of GIS data has great potential for planning network improvements, continuous on-line monitoring, and improving the understanding of a network's current configuration. However, effective use of GIS and asset data is not being made in current systems that monitor utility networks.

As such, there exists a need for improved systems and methods for automated modeling and analysis of networks and network components using GIS and asset management systems. The present invention provides for improved analysis and usage of GIS data in utility network monitoring systems.

SUMMARY OF THE INVENTION

Methods and systems are provided for improved modeling, monitoring and operation of a utility network. One such method includes retrieving geographical information system (GIS) data, asset management data, and sensor archive data of one or more assets of the utility network. The method also includes generating one or more mathematical graph elements from the one or more assets and creating probable connections between the one or more mathematical graph elements based on the GIS and asset management data. A mathematical graph is generated based on the probable connections to obtain more complete GIS data. The mathematical graph includes one or more asset characteristics of the one or more assets. Analysis is performed on the utility network using the mathematical graph and the mathematical graph data of the utility network is stored for use by other systems within the utility network.

In some embodiments, the GIS data includes one or more GIS layers. GIS layers may further include an asset layer, a pipe layer, and a zone layer. Mathematical graph elements include at least one of nodes, edges, and polygons. The generated mathematical graph includes at least one of a directed graph, undirected graph, mixed graph, multi-graph, simple graph, weighted graph, and Cartesian graph. Analysis performed on the mathematical graph includes at least one of a graphical, geometrical, numerical, differential, functional, and algebraic analysis.

In certain embodiments, performing analysis on the utility network using the mathematical graph includes determining one or more consumption equations from the analysis of the mathematical graph. Performing analysis on the utility network using the mathematical graph may also include identifying flow monitoring zone (FMZ) characteristics of the utility network. Identifying FMZ characteristics include identifying split FMZs, almost split FMZs, single point of failure, and neighboring FMZs. Performing analysis on the utility network using the mathematical graph may also include generating warnings and suggested maintenance recommendations. Generating warnings and suggested maintenance recommendations includes presenting one or more physical locations on the mathematical graph.

Performing analysis on the utility network using the mathematical graph may also include locating optimal meter locations. Locating optimal meter locations includes presenting one or more physical locations on the mathematical graph. In one embodiment, locating optimal meter locations includes performing balanced cuts on the mathematical graph to partition a FMZ into sub-areas. In another embodiment, locating optimal meter locations includes identifying k-center nodes on the mathematical graph. Generating the mathematical graph structure including the plurality of mathematical graph elements may include arranging the plurality of mathematical graph elements on the mathematical graph based on the created connections.

In another aspect, the present invention provides for prioritizing areas for maintenance in a utility network. The method includes receiving a training set of historical leak data of the utility network. The method also includes receiving one or more feature values for the historical leak or failure data, the one or more feature values including factors that influence leakage rates and generating a model from the training set and the one or more feature values. The model is provided with one or more current leak locations within the utility network and associated feature values, and predicted leakage or failure rates are obtained for the one or more current leak locations from the model.

According to one embodiment of this aspect of the present invention, the predicted leakage rates can be utilized to determine field work priority wherein higher predicted leakage rates are given higher priority. Retrieving one or more feature values associated with the network areas comprises analyzing GIS data, asset data, and historical repair data. The one or more feature values may include age of hardware, pipe fittings, and valves. Feature values may also include network complexity. The network complexity may include the amount of pipes, fittings, valves, and service connections. The one or more feature values may further include geographical properties that contribute to more leaks being hidden, pressure based on topography and pressure meter readings, rate of leaks estimated from historical repair files and computational analysis of historical data from flow and pressure meters, leak frequency, loss rate, hidden time, and total costs. Generating a model from the one or more feature values of the training set may also include using a least one of linear regression, non-linear regression, decision trees, neural networks, k-nearest neighbor, and support vector machines.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
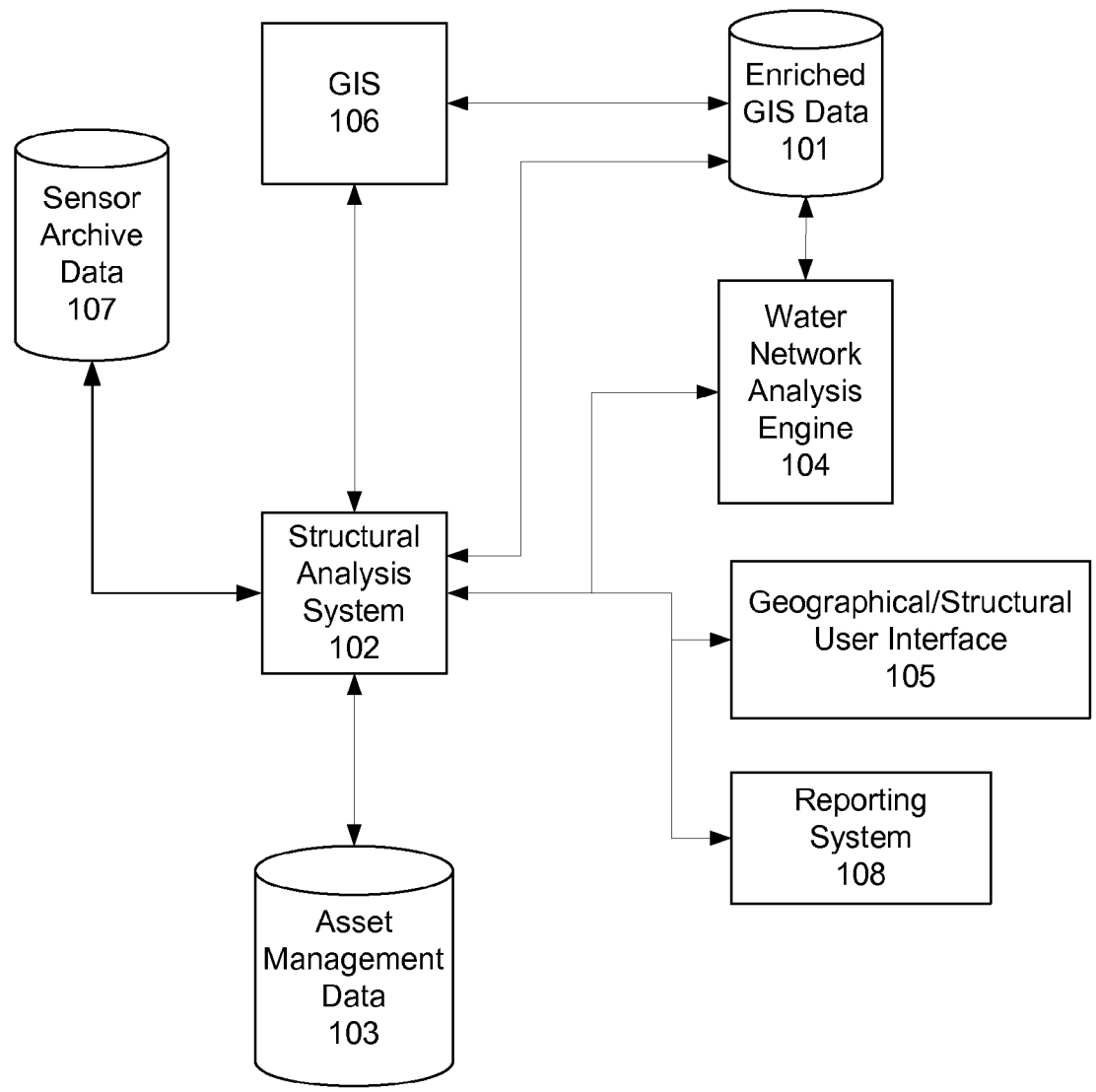
FIG. 1 presents a block diagram of a computing system according to an embodiment of the present invention.

FIG. 1 presents a block diagram illustrating one embodiment of a system for analyzing and monitoring assets and their geographical layout in a water distribution system. As shown in FIG. 1, the system includes a structural analysis system 102 operable to retrieve data from several sources including asset management database 103, geographic information system (GIS) 106, and sensor archive database 107, to analyze the retrieved data in accordance with processes described herein, and to output the resulting data to enriched GIS database 101. The enriched GIS data 101 can then be used in a number of ways including for improved analysis of anomalies and events by a water network analysis engine 104, and by other systems, all as further described herein.

Asset management database 103 stores information on assets in the water distribution system, including pipes, valves, meters and other components that make up the distribution network. Asset management database 103 may be part of an asset management system such as the Maximo™ system available from IBM Corp. Asset management data may be any information associated with network assets relating to infrastructure and inventory of a network. For example, asset management data may include information such as age, size, shape, length, diameter, material, and other characteristics, concerning pipes, line segments, valves, and meters installed in the network. Asset management data may further include data which indicates an anomaly, such as consumer reports of service failures, or sightings of a visible burst, administrator or operational divisions of the network, information concerning water utility network operations, such as routine or planned water utility network operations, opening and closing of valves that affect water flow, pump operations, acoustic surveys, repairs or improvements made to any part of the water utility network, dates and times of the repairs or improvements, locations of the repairs or improvements, routine maintenance made to the network, and access control information indicating when and where on the network technical personnel may be active. The data in asset management database 103 is typically used to help manage the water utility network.

GIS 106 provides GIS data which describes the structure and layout of the water utility network and the positioning of the meters across it. GIS data may include: descriptions of the water pipes such as the diameter, length, installation date and manufacturing materials; meter types, meter locations, and meter ages; partitions of the network into pressure zones and/or supply zones; a city or area map; and additional evolving data recognized by one of skill in the art. GIS 106 may also record features of a water distribution system including pipes, valves, pumps, treatment plant, reservoirs, storage tanks, etc., as well as customer and pipe locations and past usage, elevations, etc. GIS may further store data regarding portions of the network such as District Meter Areas ("DMA"s) or Flow Monitoring Zones ("FMZ"s). By way of background, utilities companies often divide their utility networks into several DMAs for identifying problematic areas that may contain leaks. A DMA is usually a sub-network that is partitioned by geographical area (such as a polygon on a map where the customers served by it are located) or inlet/outlet points. All inlet/outlet points are monitored by flow meters, allowing the total flow into that sub-network to be deduced. Sub-networks with such "total flow monitoring" may also be created as a by-product of network planning or maintenance and this description refers to all such sub-networks, inadvertent or deliberate, as Flow Monitoring Zones, or FMZs. FMZs may result from a division or an inadvertent split of DMAs that may have in turn resulted from valve closures or the maintenance or installation of new pipes. FMZs divide a utility network into manageable sections in order to make it easier for engineers to determine the occurrence and location of bursts and other faults and to repair them.

In some systems, GIS data from GIS 106 represent pipes as layers or collections of line segments or broken lines, represent sensors as points, and represent larger objects or areas such as a tank, DMA, or water treatment plant as polygons. Assets' locations may be represented using x-y coordinates (or x-y-z, including elevation), e.g. one set for a point asset, two for the ends of a line segment, or several for the vertices of a polygon. Hierarchical relationships between GIS objects may also be recorded, for example storing for each DMA a table of identifiers of the assets which form part of that DMA, and recording for each of those assets that it belongs to that DMA.

At least a portion of the GIS data may be retrieved or derived from asset management data 103 and GIS 106. Data obtained from GIS 106, sensor archive data 107, and asset management data 103 may be non-live/non-real-time data such as data that has been archived or offline data that includes data of typical operating conditions. Non-live data can be static snapshots of the water utility network that may be updated regularly or periodically. It is also noted that this data may be evolutionary data including updates consistent with the evolution of the underlying resource system itself, for example, when new water pipes, connections, meters, etc., are installed or otherwise modified in the system. Furthermore, this data may include updates when the underlying resource system is sampled or measured, for example where existing pipes are inspected for material fatigue or internal constriction by accumulated solid deposits. Any other characteristics of the geography and engineering of the water distribution system may also be utilized, as well as any other data relied on by one skilled in the art.

Structural analysis system 102 is a computer system capable of capturing, storing, analyzing, managing and presenting data with reference to geographic location data provided by GIS 106. The structural analysis system 102 links or integrates information that is difficult to associate through any other means, and analyses this information to improve the quality of GIS data and gain new insight into network structure, not readily available through any other means. For example, structural analysis system 102 is programmed to merge GIS data from GIS 106 with asset management data 103 and sensor archive data 107 to create the enriched GIS data stored in database 101. Structural analysis system 102 can use combinations of mapped variables from other data sources to build and analyze new variables. The processes employed in structural analysis system 102 to analyze and merge this data are set forth in greater detail below. Structural analysis system 102 consists of various software modules and databases residing on computer hardware and performing the functions described further below. Although illustrated as a single system, in various embodiments the illustrated system may be integrated and/or distributed across multiple hardware devices or processors and may be distributed logically, physically or geographically. Structural analysis system 102 may be any suitable physical processing device performing processing operations as described herein, in response to executable instructions.

As shown in FIG. 1, the enriched GIS data 101 generated by structural analysis system 102 is used by other systems including a water network analysis engine 104 and the original GIS 106. In addition, the output from the structural analysis system 102 is provided to various output and reporting modules including a geographical/structural user interface 105, and a reporting system 108. The operation of these modules and the use they make of the output of the structural analysis system 102 is described further below.

The water network analysis engine 104 analyzes data received from different meters, sensors, reading devices, or other data sources pertaining to a distribution network, detects anomalous data and classifies some detected anomalies as events. One of skill in the art will appreciate that unless the specific context explicitly indicates otherwise, as used herein the terms "meter," "sensor," and "logger" generally refer to the same class of network devices and encompass any meter, sensor, gauge, or other device capable of measuring parameters or values or a stimulus, especially stimuli relating to a water distribution network. The water analysis engine 104 provides automated analysis of the water distribution network based on the received data, and provides real-time alerts, off-line data reports and network planning recommendations to users who can then take action. The types of event detected by the water network analysis engine 104 include leaks, bursts, water consumption changes, faulty meters, meter calibration problems, water quality changes, malfunctions in network devices, asset utilization, sub-network characteristics, and other events known to those skilled in the art. Analysis engine 104 may be any network analysis system suitable for use with a water treatment plant, which may be any suitable resource distribution network, such as a municipal, rural, or wholesaler water utility network, liquid distribution network in a factory or other large building, or naval vessel, or any suitable resource collection network such as a sewer system. An example of a water network analysis engine includes the one described in previously mentioned and commonly owned U.S. Pat. No. 7,920,983 and offered from the assignee TaKaDu Ltd., though analysis engines available from other entities may also be used within the context of the present invention.

In one embodiment, structural analysis system 102 stores, manipulates, and reports distribution regions in the form of predefined network parts such as DMAs or pressure zones. This information may be presented as polygons on a geographical map, ranges of addresses, or sets of marked or named network assets such as lengths of pipe. Reports may be generated at reporting system 108 from a combination and processing of the aforementioned data from GIS 106, sensor archive data 107, and asset management data 103. Data from structural analysis system 102 may also be retrieved by one or more interface systems on geographical/structural user interface 105. For example, the data may be retrieved by a trouble ticket interface system to inform maintenance personnel of leaks or other events. An example of trouble ticketing software is Numara®'s Track-It!®. As another example, the event data may be sent to a workflow interface system. One example of a workflow system interface is Handysoft's Bizflow®. Event data, for event reporting to users, is well categorized and can be adapted for use by any industry standard interface. In addition to GIS information, the geographical/structural user interface 105 may receive automated recommendations and analysis of GIS data, asset management, map, and various other data input streams used by the structural analysis system 102, as additional layers. Information received by geographical/structural user interface 105 is stored and, in some embodiments, may be fed back into structural analysis system 102 or used to supplement enriched GIS database 101.

Different types of interface systems may be used to provide information on events to users or external systems in different ways. The geographical/structural user interface 105 may be accessed by various computerized devices, such as desktop computers and laptops, cell phones, blackberry devices, smart phones, pagers and other mobile devices programmed to receive pages, trouble tickets and other types of alerts. The user interface 105 may be accessed by computerized devices requesting it from servers connected over any suitable network, such as the Internet, or may be pushed out to such devices for viewing by users or input into other systems such as trouble tickets systems. Outputs from water network analysis engine 104 and/or structural analysis system 102 may be stored in the enriched GIS database 101, in an electronic log file, and/or printed to paper. Previously stored data may be accessed from storage to provide continuity in the reporting of events, for example to update that a previously detected event is still ongoing, rather than detecting it as an additional, separate event. Previously stored data may also be used to generate training sets for predicting future leakage rates or costs, and testing.

In accordance with aspects of the present invention, data provided by structural analysis system 102 is displayable as mathematical graphs on geographical/structural user interface 105. Mathematical graphs include linear networks of objects that can be used to represent interconnected features and to perform spatial analysis on them. A mathematical graph may be composed of edges connected at nodes or points, similar to graphs in mathematics and computer science, and may include single dimension non-planar graphs with the edge and node elements connected by a topology with additional features and characteristics of the nodes and edges displayed on the graph. According to the embodiments of the present invention, pipes may be represented as edges connected to features including other pipes, valves, meters, hydrants, and other network assets. As with other types of graphs, a network graph can have characteristics such as numerical weights and flows assigned to its edges, which can be used to represent the various interconnected features more accurately. Mathematical graphs may similarly be used to model road networks and other resource utility networks, such as electric or gas utility networks.

GIS data retrieved from GIS 106 is transformed into mathematical graph structures by various pre-processing of asset information by structural analysis system 102. Transformation and pre-processing of asset and GIS data are described in further detail below with respect to FIG. 2. By transforming the GIS data into a mathematical graph structure, characterizing the connectivity and parameters of the various network assets, and by applying standard graph-based algorithms to the data in GIS layers such as pipes, assets, and zones or DMAs, a network trace of each FMZ or DMA may be obtained. The trace may include all the pipes, valves and other network assets that illustrate how a real or actual DMA may be laid out as a result of the pre-processing. Using the traces and auxiliary information from the GIS, interesting insights about the network may be extracted, some of which may also improve monitoring capabilities of water network analysis engine 104. As described in further detail below, analysis of GIS data may be used to provide FMZ consumption equations or formulas, more accurately predict leakage rates and test for leaks, assist with network planning and installing pipes, make better recommendations for performing network maintenance, configuring networks, and installing additional meters to improve data for network analysis.

Figure 2:
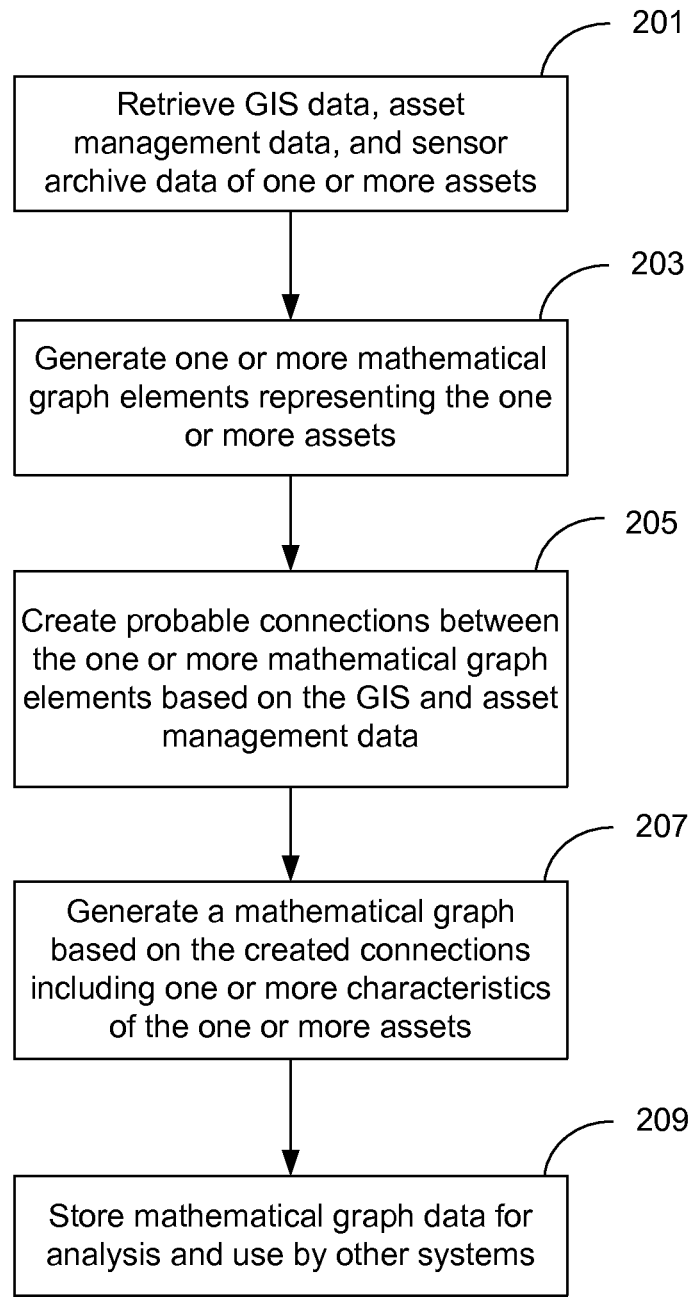
FIG. 2 presents a flow diagram of a method for modeling a water utility network according to an embodiment of the present invention.

FIG. 2 presents a flow diagram of a method for modeling a water utility network according to an embodiment of the present invention. In step 201, GIS data, asset management data, and sensor archive data of one or more assets are retrieved from a GIS database, asset management system and/or an archive of static snap-shots of GIS layers. The GIS layers may include asset layers, pipe layers, and regional layers such as subdivision into DMAs, pressure zones, and supply zones. Retrieval of GIS and asset data may include retrieval of points, locations, and borders representative of the assets and their physical locations or approximate physical locations in a region. One or more mathematical graph elements representing the one or more assets are generated from the retrieved data, step 203. Generating the one or more mathematical graph elements involves, in some embodiments, generating abstract representations of the retrieved data such as generating a list of nodes corresponding to certain types of assets such as sensors, valves or connections, generating lists of edges representing pipes, and generating polygons to illustrate larger objects such as water tanks, a treatment plant or DMAs.

Probable connections are created between the one or more mathematical graph elements based on the GIS and asset management data, step 205. As previously mentioned, information available from GIS and asset management data generally do not provide connections between assets. Therefore, pre-processing of asset and GIS data is performed. As described further with reference to FIGS. 3-5, pre-processing includes transforming assets and other items from the GIS data into a list of nodes and creating probable connections by analyzing an overlay of various GIS layers. A table is also created storing the probable connections established by the pre-processing including pipe/asset ID, a start point, and end point, diameter of the pipe, age, and other asset management data previously mentioned. From the table, associations or connections may be made between where different assets connect. For example, pipes may be connected to each other, along with any meters, valves, hydrants, etc. All of these assets may be grouped or fitted into a polygon representing a given DMA indicating that the assets are all within the given DMA, and this grouping of assets and their associated connections is stored in a DMA table, with long pipes extending through but not connected to any pipes of a DMA also reflected in or determined contextually from the data included in the DMA table. This process is further described with reference to FIG. 4.

In a next step 207, a mathematical graph is generated based on the created connections including the characteristics of the one or more assets. A mathematical graph of the elements may be a directed graph, undirected graph, mixed graph, multi-graph, simple graph, weighted graph, or Cartesian graph. Because the mathematical graph elements are arranged in the mathematical graph based on their connectivity and other associations with one another, the graph resembles a map or network of connected assets.

Step 209 includes storing the mathematical graph data for analysis and for use by other systems. These other systems may include a geographical/structural user interface and a reporting system. The mathematical graph may also be provided to a network analysis engine, a database for storage, or used to supplement a GIS system. The connections created between the one or more mathematical graph elements enables mathematical analysis on the mathematical graph. Mathematical analysis performed on the mathematical graph may include graphical, geometrical, numerical, differential, functional, and algebraic analysis. The analysis performed on the mathematical graph may be used to identify DMA characteristics, generate warnings, suggest maintenance recommendations, and locate optimal meter locations, which are described in further detail below.

To generate the best mathematical graph from the data available, a best-effort type of matching is made to determine the connectivity of nodes and edges. Matching may include looking for edges with ends that are very close or the closest to each other and puzzling or connecting the ends together to identify the most probable connections. The determination of closeness may be bounded by a threshold, e.g., less than x number of feet apart. The threshold may be determined by a user of the GIS analysis system or set to a predefined value in the structural analysis system based on certain parameters and region of the assets. In one embodiment, a user may be prompted to verify assets with questionable connections. The connectivity and associations between the features of the map may be extracted and stored in an index with the edges and nodes, numbers, or fractions, etc.

Figure 3:
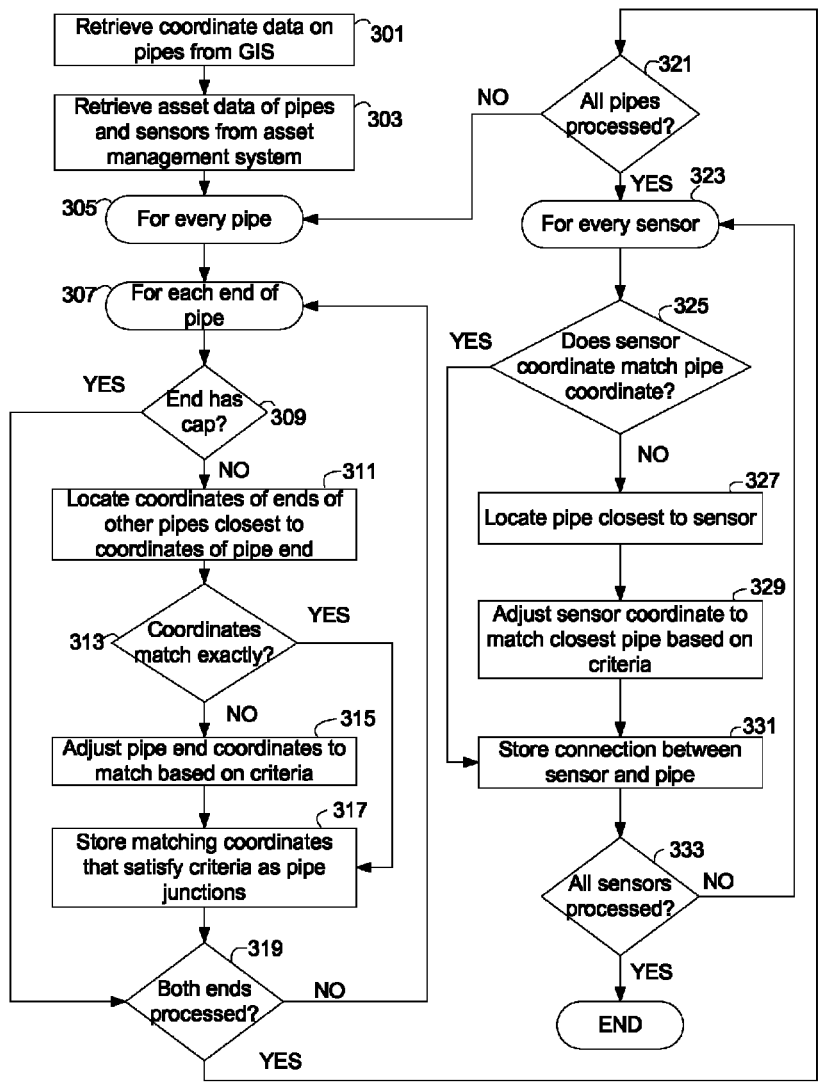
FIGS. 3 and 4 present flow diagrams of a method for pre-processing asset management and GIS data according to an embodiment of the present invention.

One embodiment of this method for pre-processing asset management and GIS data according to the present invention is illustrated in FIG. 3. A first phase of the pre-processing, sometimes referred to herein as snapping, starts at step 301, in which coordinate data on pipes are retrieved from the GIS. Coordinate data may include x-y coordinates, street addresses, latitude/longitude coordinates, or other types of geographical coordinate representations used in GIS systems. Asset data of pipes and sensors from an asset management system are retrieved, step 303. The snapping process loops through each pipe, step 305, and each end of every pipe, step 307, which are analyzed using the data retrieved from steps 301 and 303. Every pipe may include a given location, region, DMZ, FMZ, or any specified network of pipes. Steps 305 and 307 may be carried out as a nested for-loop or any other suitable type of recursive programming statements.

For each pipe end, a determination is made whether the given end of the pipe is a capped end or a service supply connection, or otherwise not expected to connect onwards to another pipe or asset, step 309. A capped end is typically an end of a pipe in which a cap is placed on the end of the pipe that prevents water from flowing past beyond the capped end. This information would typically be stored in the GIS or asset management data, or readily deducible from it. If the end has a cap, the method proceeds to determine whether both ends have been processed, step 319. Otherwise, coordinates of ends of other pipes closest to coordinates of the pipe end are located from the GIS data, step 311. In step 313, a determination is made whether the coordinates of the pipe and the located coordinates closest to the pipe match exactly or nearly exactly. If the coordinates are exact or matches, the matching coordinates are stored as pipe junctions, step 317. However, if they do not match, one or both of the pipe end coordinates are adjusted to match based on some criteria, step 315, before being stored as pipe junctions in step 317. Criteria to adjust the coordinates may include, but are not limited to, relative location, asset age and material, pipe diameter, etc. In an exemplary criterion, a given pipe end may be much closer than other pipe ends in consideration, where the other pipe ends can be snapped to additional pipes, then the given pipe may pass such a criterion. In a further example, a given pipe end which is not the closest pipe end may be the only candidate of matching diameter, and may be selected based on this criterion. Step 317 may also include raising an exception for the pipe end coordinates if no match passes the criteria. For example, if several pipe ends are reasonable candidates to snap to a given pipe end, the system chooses not to snap anything, but rather flags the data point for user attention.

A determination is made whether both ends have been processed, step 319. If not, the method returns to step 307 to process the other end of the given pipe. When both ends have been processed, a determination is made whether all pipes have been processed, step 321. If all pipes have not been processed, the method returns to step 305 to continue processing other unprocessed pipes in the same fashion. At the completion of this snapping phase of pre-processing, the ends of the pipes in the network have, wherever possible, been "snapped" together in the model based on data from the GIS and asset management system, so that a cohesive and comprehensive model of the connections between pipes can be generated. The connections are stored in the database as junctions, pending further pre-processing described below with reference to FIG. 4.

Upon processing all the pipes, processing is performed for every sensor, step 323, in a second, similar phase of pre-processing involving proper location of sensors in the network. In step 325, a determination is made whether a given sensor coordinate as retrieved from the GIS matches a pipe coordinate. If the coordinates match, the method bypasses steps 327 and 329 and the sensor data is stored, step 331. Otherwise, a pipe closest to the sensor is located, step 327. One of skill in the art will recognise that certain types of sensors may be located along pipes, and other types may be located only at pipe ends (joints) or at other particular assets or parts of assets; processing proceeds according to such location requirements for each sensor type. The coordinate of the sensor is adjusted to match the closest pipe based on criteria, step 329. Following steps 327 and 329, the connection between sensor and pipe is stored in step 331. Criteria for sensor connection may be similar to the ones described for pipe ends. Storing a sensor connection may include storing a sensor identification, coordinate, or adjusted coordinate in the GIS or asset management record of the pipe, and vice versa. In step 333, a determination is made whether all sensors have been processed. If not, the method returns to step 323 to continue processing the remaining sensors not yet processed. When all the sensors have been processed, the sensors positioned throughout the network have been properly located within the pipe or joint in which they are installed. Although this processing has been described for the improvement of GIS data on sensor locations and their connection to pipes, one skilled in the art will appreciate that the same or similar method may be employed to find the logical or connection relationship between any two types of assets, as required for analysis of the network layout.

Figure 4:
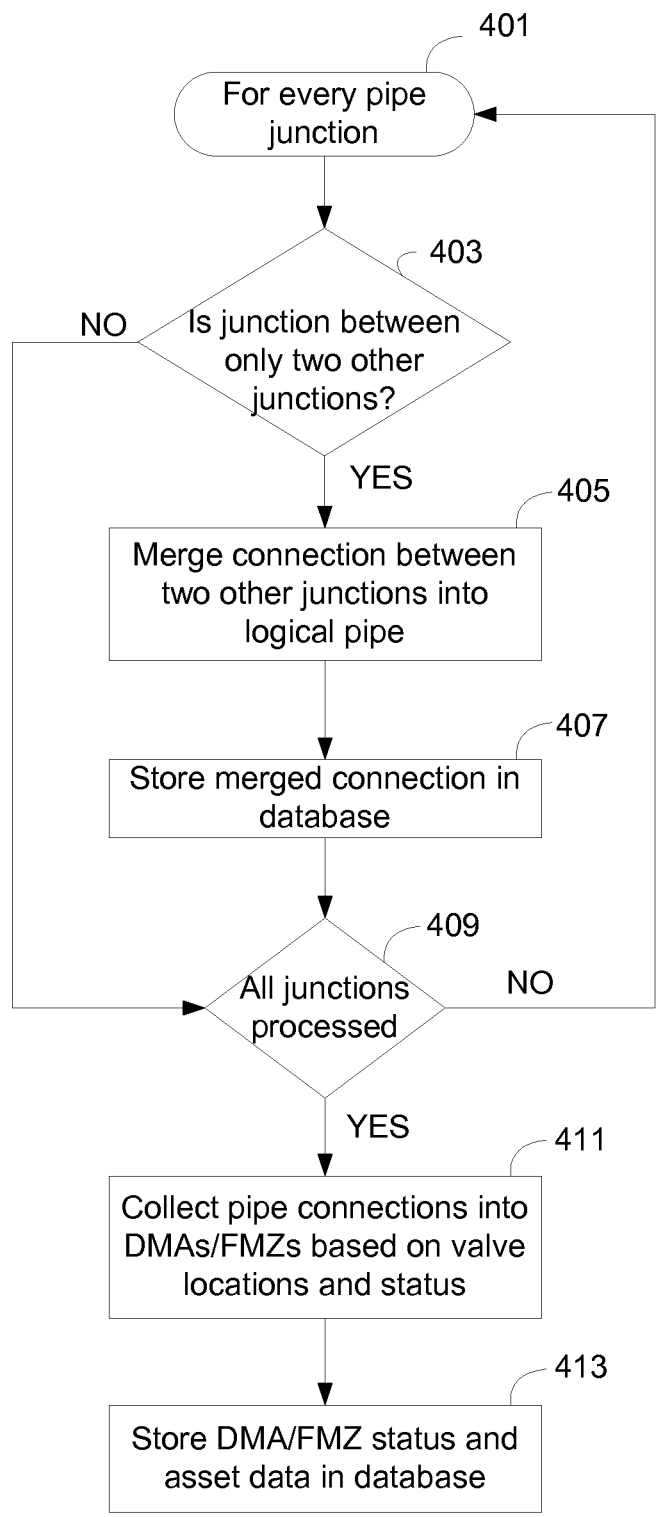

In a next phase of pre-processing of GIS and asset management data, the pipes and sensors preprocessed according to the methods of FIG. 3 are organized into higher level structures such as DMAs. As shown in FIG. 4, this processing is performed for every pipe junction found through snapping of pipe ends during pre-processing, step 401. Every pipe junction entry may include a given location, region, DMZ, FMZ, or any specified network of pipes and assets. For each junction, a determination is made whether there the junction is between only two other junctions, step 403. For example, if a first junction is found to be connected to a second junction via two pipes connected only by a third junction, then the connection between the first and second junctions is merged into a single logical pipe, step 405, and the third junction is eliminated as a junction. The merged connection is stored in a database, step 407. If the given junction is not between only two other junctions, then the method proceeds to determine whether there are any other junctions to process, step 409. Upon determining that there are still junctions to be processed, the method returns to step 401 to process the remaining unprocessed junctions in the same fashion. When all junctions have been processed, pipe connections and junctions are collected into DMAs or FMZs based on valve locations and status, step 411. The system traverses the network graph, starting from the known inlets of the DMA, or from other points known to be part of the DMA, such as certain listed sensors or other assets, and treating capped pipes, closed valves, and flow meters as "disconnects" or boundaries. Any method for finding "connected graph components" may be used, as known to one skilled in the art. The resulting subgraph is taken to be the total collection of assets in the DMA. The DMA or FMZ status and asset data are stored in a database, step 413. In one embodiment, the pipe connections, junctions, statuses, and asset data may be stored in the enriched GIS database. In some embodiments, the system may further verify that the resulting subgraph does not extend significantly beyond the polygon stored in GIS as the approximate DMA geographical boundary, nor cover significantly less than the total assets within that polygon. One of skill in the art will appreciate that geometrical inclusion of asset within the DMA boundaries is not exactly equivalent to being a logical, functional part of that DMA, depending on actual hydraulic connectivity.

Figure 5:
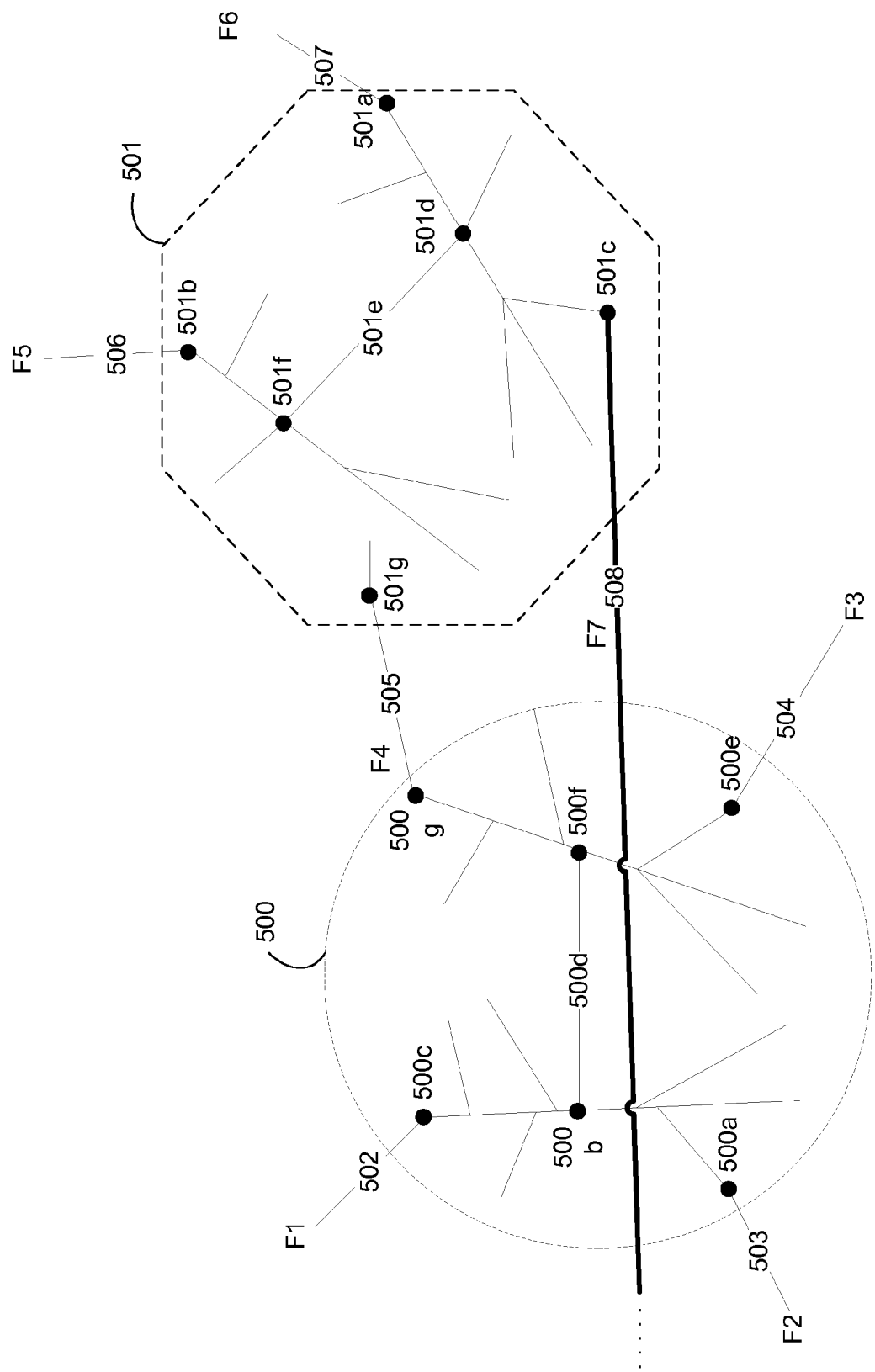
FIGS. 5 and 6 present network graphs for characterizing water sub-networks according to certain embodiments of the present invention.

Following the pre-processing of the GIS and asset data, the enriched GIS database contains an accurate set of structural and geographic data from which mathematical graphs and network traces can be made to view a full topology of the network. The network trace may be displayed on a user interface. FIG. 5 illustrates an exemplary network trace depicted as a mathematical graph including a map of assets, and/or GIS layers or data corresponding to DMAs of a water distribution network in a region. DMAs depicted on the network trace may be selected by a network planner where certain DMAs may be added to or removed from the network trace for display and analysis. The network graph may show pipes and other assets with characteristic information of the assets within one or more DMAs, e.g., length, physical characteristics, diameter, age, etc., displayed along with assets, or hidden within the assets and displayable upon selection, navigation to, or hovering with a cursor over the assets. A network graph such as this may include graphical depictions and locations of pipes and assets in a given DMA. In one embodiment, the pipes and other assets in the network graph may be searchable. In another embodiment, the characteristics may be visibly displayed along or adjacent to each asset.

As shown in FIG. 5, DMA 500 includes inlets 502, 503, 504 and 505, nodes 500a, 500b, 500c, 500e, 500f, 500g, and segment 500d. DMA 501 includes inlets 505, 506, 507 and 508, nodes 501a, 501b, 501c, 501d, 501e, 501f, 501g, and segment 501e. Inlets 502, 503, 504, and 505 are respectively connected to nodes 500c, 500a, 500e, and 500g in DMA 500, while inlets 505, 506, 507 and 508 are respectively connected to nodes 501g, 501b, 501a, and 501c. The inlets may provide a flow of water into the DMAs or out of the DMAs. Inlets that provide water out of DMAs may also be referred to as outlets. Inlet 505 is an inlet that is shared between and connects DMA 500 and DMA 501. The illustrated graph also shows that inlet 508 connected to DMA 501, overlaps across, but is not connected to or part of, DMA 500. Inlet 508 may be a water main that distributes water to secondary distribution lines such as in DMA 501.

Each of the illustrated lines/edges and inlets 502-508, segments 500d and 501e may be pipes or mains in the DMAs. Nodes 500a, 500c, 500g, 500e, 501a, 501b, 501c and 501g may be meters and sensors, whereas nodes 500b, 500f, 501d and 501f may be meters and sensors or any other type of asset such as valves. As known to those of skill in the art, meters or sensors monitor and measure characteristics of the fluid flowing through the inlet pipes. Such characteristics may include flow rate, pressure, temperature, pH, salinity, chlorine amount and turbidity. F1, F2, F3, F4, F5, F6, and F7 in FIG. 5 indicate flow rates measured at the corresponding inlets. F1-F7 may also represent a pressure value or any other characteristics measured across the pipes.

In some embodiments, the graph or connectivity structure may be stored as adjacency matrices, adjacency lists (represented by arrays, linked lists, or hash tables), or any other suitable data structure known by one of ordinary skill in the art. In another embodiment of the present invention, mathematical transformation of the map and/or GIS layers and data may include determining flow monitoring zone or FMZ consumption equations or formulas. A FMZ is generally an area or district of a distribution system which is specifically defined, e.g. by the closure of valves, and in which the quantities of water or other resources entering and leaving the district are metered. A FMZ may be described as a subnetwork connected to the rest of the network only through valves which are routinely closed or through flow meters; DMAs are typically FMZs deliberately laid out by network planners and used by network operators for monitoring purposes. As an example, referring to FIG. 5, a maintenance closure of segment 500d in DMA 500 would result in the creation of two FMZs within DMA 500.

One way to monitor a water system may include tracking consumption equations, or the sums of flow meters that define FMZs. These include flow meters at the inlets of the FMZ. Such equations may be used, for example, to monitor for leaks. Consumption formulas enrich the geographic information about assets for utility companies. Many water utilities have a partial or inaccurate list of consumption equations. Identifying the flow meters along the boundaries of a FMZ is a product of performing a proper network trace, but is insufficient, as flow meters either measure flow in one direction only, or have a direction measured as positive flow, and one measured as negative. These directions are rarely recorded reliably and may change occasionally during maintenance as meters may be rotated and replaced without proper recording of the orientation or direction of the meters.

Data collected from meters and sensors at these various locations is fed into the water network analysis engine as described above. By virtue of the processes performed on the GIS and asset data by the structural analysis system of the present invention as described herein, the network analysis engine now has access to more accurate structural and topology information on the network from which to perform its anomaly detection. As a result, the network analysis engine can produce significantly more accurate results in the way of improved anomaly detection, better classification of events, more accurate location of events within the network, and fewer false positives, among other things.

For example, using GIS data, statistical algorithms, and recent meter data, water utilities may find additional consumption equations or correct existing ones. GIS layers or data from a map are analyzed to find FMZs, which may include sub-networks in which all the inlets and outlets are metered. Referring to FIG. 5, consumption of FMZs may be derived and modeled from the enriched GIS data or from a graph of the network. The directional signs of each flow meter may need to be determined for each consumption equation (i.e., should the meter be added or subtracted). Directions for each flow meter may be represented by the polarity of the values of F1-F7 of FIG. 5. Generally, a positive flow of water into a given DMA is represented by a positive value, while a negative flow of water out of the same DMA is represented by a negative value. For example, inlet 505 may have a positive '+' sign F4 or consumption, measured at node 500g, while the opposite end of inlet 505 may have a negative '−' sign F4 or consumption, measured at node 501g. Similarly, nodes 500a, 500c, 500e and 500g may have '+' signs and the sum of positive flow at nodes 500a, 500c, 500e and 500g should be equal to the sum of negative flow values seen on the opposite ends of inlets 502, 503, 504 and 505, so that the net sum of flows on both ends of inlets 502, 503, 504 and 505 is equal to zero +/− to maintain the law of conservation of mass.

In reality, information concerning flows may be missing and difficult to determine. However, according to an embodiment of the present invention, a "best guess" approach may be taken. In determining the actual consumption flows or signs, probabilities of possible flow combinations are calculated to match several criteria, factors, and conditions. For example, to determine a plausible consumption formula for DMA 500, a plurality of flow direction combinations is determined by a sum of (+/−) F1, (+/−) F2, (+/−) F3, and (+/−) F4. The probability of a most correct flow direction combination may be based on a comparison of actual flow values from the DMA's flow meters with general DMA day/night consumption expectations (possibly based on number and characteristics of service connections), periodicity, historical or actual consumption data, and variance. When added correctly, a graph of consumption should result in a smooth curve with the above-listed characteristics and some additional short-term variances (random noise). In essence, each of the flow directions corresponding to the flow values of F1-F4 may be "reverse engineered" to match an expected net consumption. In one embodiment, small inlets affecting less than, for example, 1%, may not matter and can be ignored in determining the consumption formulas. It is to be noted that while this method may not produce the exact signs for each flow value, a correct or nearly correct net result of the consumption formula will be determined.

If flow meter signs cannot be found directly from the GIS data (or are suspect because of an unreasonable pattern for the sum), statistical algorithms may be applied to automatically infer signs from the GIS and sensor data. Unreasonable patterns may be determined by conducting periodic analysis of meter data (e.g., every month) retrieved from the sensor archive database utilizing a monitoring system and comparing the analysis with the sum. According to one embodiment for determining flow directions of the present invention, a combination of all possible signs of meters may be searched for each FMZ and verified with meter configurations to produce consistent consumption patterns. Various attributes of the consumption values may be verified in order to check whether the consumption values match the typical expected patterns (e.g., they should exhibit daily, weekly, seasonal patterns, and the ratio between the minimum and maximal daily values should be within a certain range and have a low variance, etc.). Consumption values may also be verified by determining the statistical likelihood of the values in light of historical patterns of an examined FMZ (e.g. showing that "flipping" a single meter direction completely explains a sudden change in flow patterns), in light of similar FMZs, or in light of typical FMZ patterns. If more than one satisfactory configuration exists for some of the FMZs, configurations may be ruled out by comparing FMZs that share one or more flow meters. For example, if a flow meter is determined to have a '+' sign in a FMZ (because the '−' direction doesn't produce the expected consumption pattern), then the flow meter on the opposite side must have a '−' sign in the FMZ.

According to another embodiment of the invention, a score may be generated for each configuration of meter directions in the entire network to describe how well the resulting consumption values match the expected patterns, and the best-scoring configuration of meter directions may be selected. This may be required, in the event that conflicting "best guesses" for many DMAs—considered individually—cannot be easily resolved. An exhaustive search for all possible directions for network meters may not be feasible, unlike a search for five meters in a single FMZ, for example. Accordingly, optimization procedures or algorithms known by one of ordinary skill in the art may be applied to determine the possible sign combinations. This could be by means of a genetic algorithm or simulated annealing in order to find an optimal solution. In another embodiment, combinatorial optimization may be used to find an optimal object from a finite set of objects, in this case, flow directions.

Figure 6:
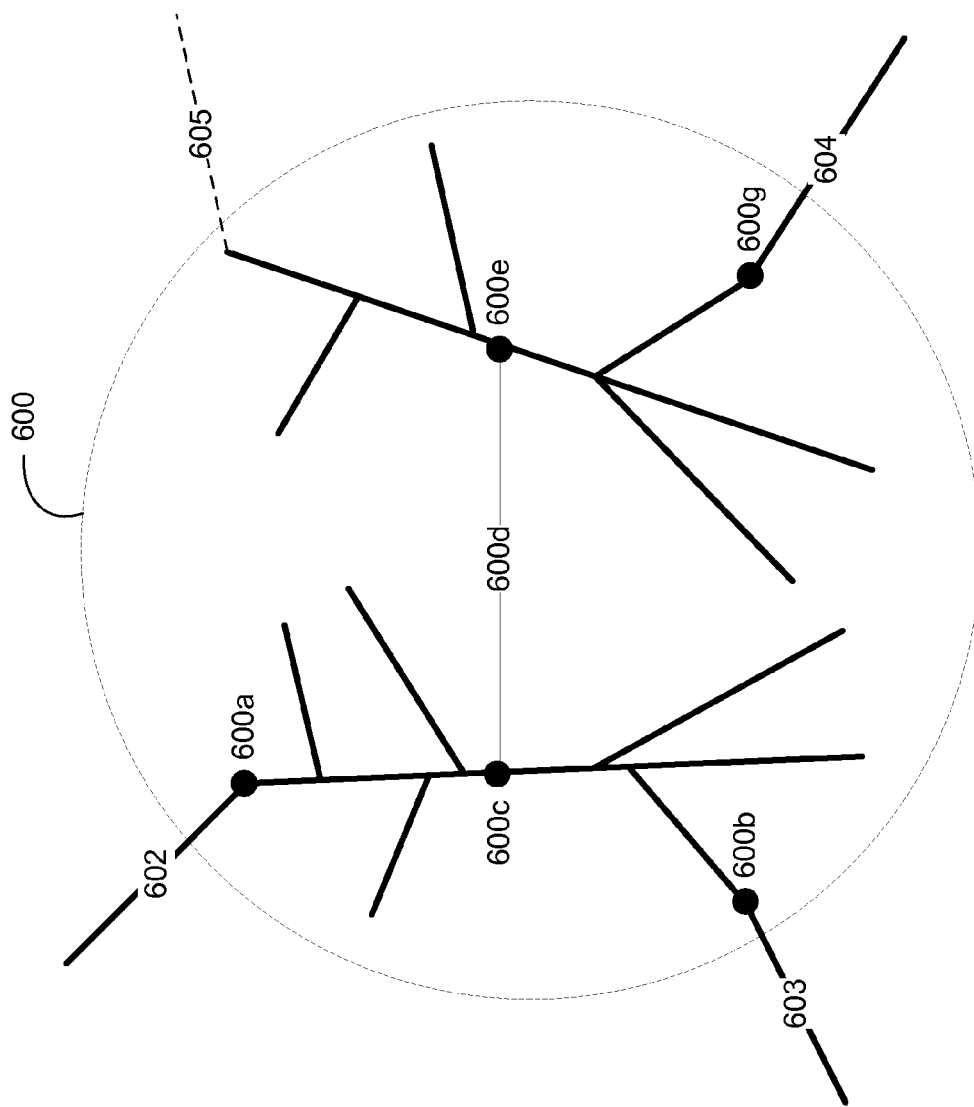

FIG. 6 presents a network graph for characterizing a water sub-network according to an embodiment of the present invention. FIG. 6 illustrates a mathematical network graph of mathematical graph elements based on enriched GIS and asset data including FMZ 600 and inlets 602, 603, and 604. A proposed inlet 605 is illustrated by a dash edge or pipe and does not exist as an actual asset in FMZ 600. Further details of proposed inlet 605 will be described in further detail below with respect to the discussion of single point of failures. FMZ 600 further includes nodes 600a, 600b, 600c, 600e, 600g, and segment 600d. Each edge may represent a pipe or main in the FMZ and each node may present another type of asset such as meters. Inlets 602, 603, and 604 are respectively connected to nodes 600a, 600b, and 600g in FMZ 600. The inlets may provide a flow of water into the FMZ or out of the FMZ.

In some embodiments, the mathematical network graph is analyzed by a network analysis engine and the results of the analysis are displayed on a user interface. Analysis of the mathematical graph may include characterizing FMZs on the mathematical graph. According to one embodiment of the present invention, "Split FMZs" may be identified on the mathematical graph, which consists of several separate sub-networks having parts that are hydraulically disconnected, or connected via a flow meter. The split FMZs may also be viewed as smaller FMZs within a FMZ. For example, two sub-FMZs may be created when the network connected to segment 600d at 600c and the network connected to segment 600d at 600e become hydraulically disconnected by virtue of the pipe represented by segment 600d being closed. Sub-FMZs typically occur when, though network planners intended to create a single DMA, subsequent maintenance, faults, and shorter-term planning break the DMA at additional points or lead to permanently closing additional valves.

Recognizing split FMZs is useful in monitoring a water system. For example, a net consumption of water in a water utility network may be computed from a subset of an original FMZ's meters. An exact equation for calculating consumption for each sub-FMZ may be determined from or inferred from the mathematical graph, as described in further detail below. Thus, each sub-FMZ may be monitored separately using analytical techniques disclosed from the previously mentioned U.S. Pat. No. 7,920,983. This may improve the sensitivity of the anomaly detection algorithms since smaller overall consumption values may be monitored, making an anomaly of given magnitude appear to stand out more in comparison. For example, referring to FIG. 5, instead of monitoring F1, F2, F3, and F4 in DMA 500, F1, F2 and F3, F4 may be monitored separately if segment 500d were to be hydraulically disconnected. Geographical resolution of anomaly detection may also improve directly, since the sub-FMZs in which detection may occur are smaller.

Similarly to the split FMZs situation described above, another characterization may include FMZs that are almost split into smaller FMZs ("almost split FMZs"). As shown by virtue of the network trace in FIG. 6, the only hydraulic connection between the rest of FMZ 600 on the other end of segment 600d and the two separate sub-networks is through a pipe from node 600c to 600e. Flow into the two separate sub-networks may be bound by or limited to the flow of the pipe at node 600c. FIG. 6 illustrates FMZ 600 containing a relatively long and narrow pipe (segment 600d) that parts into two separate sub-networks at node 600c and at 600e. The length and diameter of the pipe would have been retrieved from the asset management data and is available to the water network analysis engine from the enriched GIS database. As one skilled in the art will appreciate, given the typical flows and pressures of reasonable operation ranges in and around the FMZ, these parameters define a rough range within which the flow through that pipe may fall. In such a case, if the system determines that the flow in segment 600d is necessarily below a predefined threshold or proportional threshold, for example representing a small flow compared to the total flow into the FMZ, the two sub-networks may be treated as two "almost separate" FMZs. Each of the separate sub-networks or newly created FMZs may be monitored separately, with some known level of inaccuracy. For example, if an abnormal change is detected in the consumption of a given one of the sub-networks/almost split FMZs, and the change is larger than the maximal flow in the pipe segment 600d connecting the sub-networks, then the anomaly may be due to an event in the given one of the sub-networks since the change cannot be attributed to the water flowing from or to the segment pipe 600d.

According to another embodiment of the present invention, characterization of FMZs on a network graph such as the one illustrated in FIG. 6 may also reveal sub-networks having single feeds, which may be referred to as a "single point of failure." Such situations may be problematic, since an entire area could potentially be left with insufficient water supply or very low pressure if the single pipe feed were to be broken. This situation may result in the failure to meet a required service requirement and is costly to a water utility. Single point of failures are not limited to areas with single feeds to sub-networks, but may also apply to areas where there are inadequate amounts of pipes or valve openings feeding a plurality of sub-networks. For example, if inlet 604 were to be shut down or closed, a significant portion of FMZ 600 on the right side of segment 600d may be dramatically affected.

According to one embodiment of the present invention, a water utility planner may desire to make changes to a network to correct these issues and avoid single points of failure, such as by installing additional pipes, opening network valves, replacing pipes with ones having thicker diameters, or routing other pipes and valves to a single-feed region. Using the enriched GIS data generated by virtue of the present invention, recommendations for correcting single points of failure may be generated by the water network analysis engine. Single point of failure analysis and recommendations may include determining whether there is reasonable redundancy in the network in case of a point failure caused by a burst or closing of valves for any reason. The water analysis engine would perform graph analysis on the mathematical network graph generated by the structural analysis engine to determine and recognize single point of failure locations. The single point of failure locations may be displayed or reported to a user monitoring the water network and recommendations may be provided for resolving these issues.

For example, the recommendation may include providing a proposal for adding inlet 605. Inlet 605 may be shown on the user interface highlighted, emphasized, or, as in the example of FIG. 6, dashed to indicate to the user a recommended location for adding a pipe or feed to a sub-network of pipes. An indication of a maintenance recommendation including inlet 605 may be displayed on a user interface. The recommendation may be displayed on the user interface as a network trace of the sub-network, as illustrated in FIG. 6, or on a map with one or more GIS layers. In one embodiment, a user viewing the user interface may select to view a water utility network in either network trace or map form and may switch from one form to the other. Delivery of recommendations to a user may be displayed as a graph or list and stored in a database such as the enriched GIS database. In an alternative embodiment, recommendations may be delivered to a user of the water network analysis engine periodically based on a schedule defined either by the user or the water network analysis engine.

Similar to an "almost split FMZ," there may also be an "almost single point of failures," where alternative feeds, if a single point of failure were to fail, are incapable of supplying the area's consumption under a typical hydraulic scenario. Almost single point of failures may be subjected to the same recommendations as single point of failures. As discussed above, if inlet 604 were to be shut down or closed. A significant portion of FMZ 600 on the right side of segment 600d may be dramatically affected. According to one embodiment, segment 600d may be indicated as an almost single point of failure if inlet 604 were to be closed, as segment 600d, carrying any flow from inlets 602 and/or 603, may be unable to supply the demand previously supplied by inlet 604.

FMZs may also be characterized as neighbors if there is at least one (closed, unmetered) valve connecting between them. If one of these valves is opened, intentionally or by accident, the two FMZs become hydraulically connected, and since there is no flow meter at the connection, the FMZ consumption formulas are no longer correct. As an example illustrating neighboring FMZs, the two sub-networks connected by segment 600d at nodes 600c and 600e may be two neighboring FMZs, where in this example, segment 600d is closed. It is to be noted that two FMZs may be geographically adjacent, but they may not necessarily be hydraulic neighbors (neighboring FMZs), while two FMZs may be geographically distant, yet they may be hydraulic neighbors. According to one embodiment of the present invention, analysis of a mathematical network graphs may include analyzing all the FMZs on the mathematical graph to automatically generate a table of neighboring FMZs. This table may be utilized for identifying and classifying anomalies in the network. For example, a breach between two FMZs may be reported if an abnormal flow increase is observed in a FMZ and a decrease of similar magnitude is observed in a neighboring FMZ, where both anomalies appear to have begun simultaneously or almost simultaneously. DMA or pressure-zone breaches are a common and costly fault in water utility network operation. In one embodiment, the characterizations of FMZs (e.g., split FMZs, neighboring FMZs, etc.) may be used in the analysis of consumption in determining the consumption equations described above.

In one embodiment, analysis of a mathematical network graph may include choosing sensor locations to enable automated monitoring or to improve existing automated monitoring. A water network analysis system may help decide for a network planner how many sensors to add, in which DMAs or areas, and in which precise locations, in a manner most helpful for future monitoring, especially automatic monitoring of utility networks. As explained in the previously mentioned U.S. Pat. No. 7,920,983 and commonly owned U.S. patent application Ser. No. 13/008,819, network meters, such as flow and pressure sensors, allow the water network analysis engine to not only compute water consumption balances and perform various network operation tasks, but also to identify anomalies such as leaks, breaches, etc., and estimate their locations. Using analysis of GIS layers of a FMZ and data collected from existing network meters, automated recommendations may be made for locations to install new meters. The locations may be selected in a way that maximizes the benefits gained from the new meters with respect to the detection, classification, and geolocation of anomalies.

The methods described herein are similarly useful in determining optimal meter locations for installing additional temporary or permanent acoustic sensors in locations within the network for improving the accuracy and reliability of hydraulic models derived from the GIS data. These sensors may be temporary or mobile sensors, used to collect data for a short period, for example a few days, at a particular location, then moved to the next region to be examined. This provides for additional monitoring for periodic recalibration of the hydraulic models for a network. Data gathered from the sensors may indicate inaccuracies of the hydraulic models (when sensor data does not match model predictions) and help correct them. Results from hydraulic models should bear close resemblance to the actual performance of a hydraulic system. In other words, modelling of a network, such as a water utility network, should be calibrated to provide results bearing a close resemblance to reality. Without such frequent calibration, the model may be of limited value.

Exemplary methods for determining optimal locations for meters are now described in further detail. An FMZ may be partitioned into several smaller sub-areas, so that the flow into each of these sub-areas can be computed or estimated. In one embodiment, a partition may be made in which the sub-areas are more or less similar in size (i.e., balanced cuts) to achieve the best possible monitoring performance (e.g., to be able to accurately detect small leaks) in each of the sub-areas. The size of an area can be measured using:

water consumption, in order to optimize anomaly detection in the meters data;
total length of pipes, to minimize the cost of leak detection by acoustic teams;
cost of step-testing; and
a combination of the above, for example a weighted linear sum.

Considering a graph $G(N, E)$, where N denotes the set of nodes and E the set of edges, the balanced cut problem may be viewed as: given G and an integer $k>1$, partition N into k parts (subsets) $N1, N2, \ldots, N_k$ such that the parts are disjoint and have equal size, and the number of edges with endpoints in different parts is minimized. A cut of size k in a connected graph is a set of k edges whose removal would partition the graph into several separate connected components. A cut of size k may be selected such that the size of the largest component is minimized. In other words, a k amount of pipes in a mathematical graph of the FMZ is selected, so that if the flow in these pipes is metered, the system may effectively obtain several separate sub-areas whose consumption is monitored, and where the sub-areas are as balanced as possible, i.e., the size of the largest sub-area is minimal.

Sub-areas may be required to be smaller than a given cutoff threshold, and should be achieved with a small k value. "Balanced cut" algorithms known by one of ordinary skill in the art may be used to find optimal balanced cuts using the above measures of size. If the FMZ and the parameter k are relatively small, a brute-force exhaustive search (of edges) may be used. Otherwise, standard heuristics or optimization techniques (e.g. a genetic algorithm) may be used to converge to a good solution. In one embodiment, a water utility may select to install f new flow meters, then k shall be set to equal f. One flow meter may be installed in each pipe of an optimal (balanced) cut.

For example, referring to FIG. 6, a cut of size $k=1$ may be selected, where k is equal to the number of additional flow meters to install, and the edge between node 600b and 600c may be identified as the edge to "cut." This cut carves out a smaller FMZ to provide better monitoring and detect smaller leaks that may not be possible in a larger FMZ. A water analysis engine may indicate the installation of a meter at the edge between node 600b and 600c as an optimal location. An additional constraint may be a list of pipes (or other particular assets or locations), in which it is possible to install a flow meter. In this case, the search for a balanced cut may be limited to the listed possible locations.

According to another embodiment of the present invention, in the case p pressure loggers to be installed, k may be set to equal p/2. That is, for each of the k pipes in the balanced cut, the water utility should install two pressure loggers—one on each end of the pipe. From the hydraulic parameters of a pipe (diameter, length, and roughness), it is possible to estimate the flow along the pipe by comparing the pressure decrease between the two loggers and applying standard hydraulic equations (e.g., Hazen-Williams or Darcy-Weisbach). Two pressure loggers on each pipe essentially act as a flow meter for monitoring the flow between the sub-areas associated with each pipe. For example, pressure loggers may be installed along the edges above node 600e to serve as a flow meter that will monitor flow to proposed inlet 605. Pressure sensors may be significantly cheaper and easier to install than flow sensors, making this a desirable scenario.

Some pipes may be inadequate for this type of analysis, since the flow cannot be computed within reasonable accuracy based on the pressure drop along the pipe (e.g., if the pipe is very short or wide). In such a case, these pipes may be excluded from the k-cut search. In a common scenario, pressure loggers may only be installed in a pre-defined set of hydrants. A pipe in the network will be included in the analysis only if there are hydrants on, or hydraulically very close to, its ends. Other constraints on possible locations for installing pressure loggers may be handled similarly.

Optimal locations for installing f flow meters and p pressure loggers can be found using a combination of the above methods. The analysis may be aimed at network planning which serves to improve monitoring. One embodiment includes the selection of optimal locations for additional sensors in a DMA to enable better automatic monitoring through, for example, a system as disclosed in the previously mentioned U.S. Pat. No. 7,920,983.

According to another embodiment of the present invention, pressure loggers may be installed in such a way that will provide a reasonable approximation of pressure values at every point in the FMZ(s). These pressure values may then be compared to their standard distribution (e.g., using previous days or weeks) of pressure values. An abnormal decrease in pressure in a certain area within the FMZ implies increased flow to that area, e.g., due to a leak. More accurate and robust results can be attained with a hydraulic model that is calibrated using the data from all the meters.

In order to place p pressure loggers, a k-center problem on the network trace of the FMZ may be solved, with k=p (pressure loggers). That is, a k-center is a set of k "center" nodes in the graph, such that the largest distance from any node in the network to its nearest center node is minimal. A pressure logger may be installed at each center of a k-center solution. The distance measure used may be an approximation of the hydraulic distance between two points, e.g., the expected pressure drop between the two points according to the Hazen-Williams formula, assuming some fixed flow F between the points. In an alternative embodiment, the average flow between two points under normal conditions may be used as the flow F between the points, in case this flow can be estimated, e.g., from a hydraulic simulation. Heuristics and approximation algorithms known by one of ordinary skill in the art may be used for solving the k-center problem. If the pressure loggers can be installed only in a pre-defined set of points (e.g., hydrants), then a variant of the k-center problem may be solved, wherein the centers can only be placed in a subset of the graph's nodes.

In order to detect hidden ("background") leaks or prevent future leaks, utilities may carry out large-scale acoustic surveys or maintenance projects, such as replacing pipes and other equipment. Both tasks are labor intensive and costly, so identifying the best target locations is extremely important. Leakage-prone areas within the network that should be targeted for maintenance or acoustic inspection may be identified and prioritized by a combined analysis of the GIS layers using the enriched GIS data and the online metered data. Below are examples of features that might increase the rate of leaks in a specific area (e.g., FMZ or pressure managed zone):
  average (and/or maximum) age of hardware, mainly pipes, fittings and valves;
  network complexity, e.g., number of pipes, fittings, valves (of various types), service connections;
  geographical properties that contribute to more leaks being hidden (as opposed to visible), e.g., areas near rivers, coasts, or areas with soft land;
  high pressure, or large variability of pressure, as inferred from:
    a. topography—large differences in elevation within the same pressure zone imply that the pressure in the low elevation points is probably high;
    b. pressure meters readings;
  high rate of leaks or bursts, estimated from:
    a. historical repairs files;
    b. computational analysis of historical data from flow and pressure meters;
  several leak-related parameters may also be analyzed, such as:
  leak frequency—total number of leaks per day per ft of pipe;
  water loss rate—total amount of water lost per day per ft of pipe;
  hidden time—average time it took for a leak to be detected (estimate the leak's start time by analyzing the historical meter data); and
  total cost—sum of all relevant costs, e.g., due to water loss, repairs, collateral damage, regulator fines.

Figure 7:
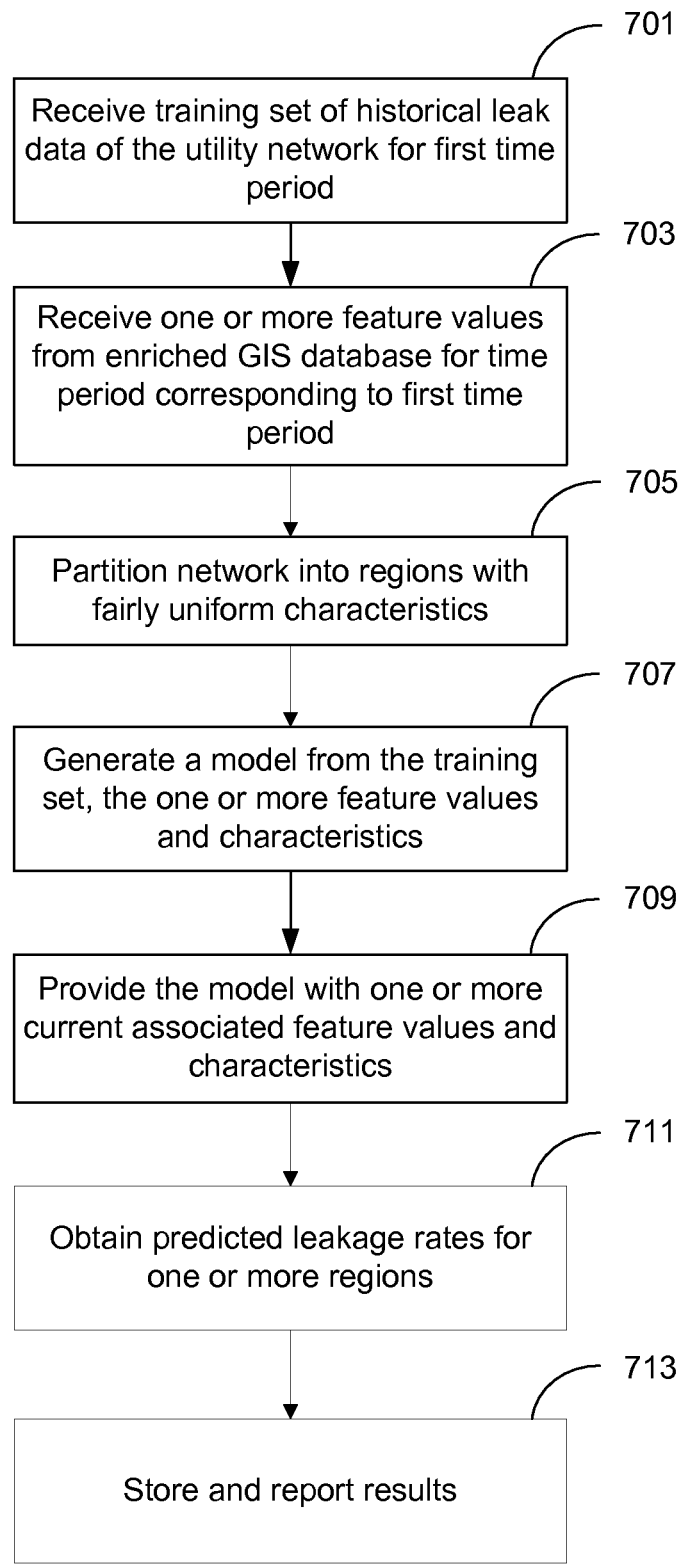
FIG. 7 presents a flow diagram of a method for predicting leakage rates for prioritizing areas of maintenance according to an embodiment of the present invention.

Another way in which the enriched GIS data generated by virtue of the present invention may be used to improve operation of a water utility network is for prioritizing areas for maintenance. FIG. 7 presents a flow diagram of just such a method for prioritizing according to an embodiment of the present invention. In order to choose the best parameters for the algorithm and combine the information from the various features, machine-learning may be used. In step 701 a training set of historical leak data for a first time period of the utility network is received. The training set may include recorded locations of previous leaks, bursts, or failures, and an associated leak rate for a duration of the leaks at the recorded locations. Next, in step 703, one or more feature values are retrieved from enriched GIS database for a time period corresponding to the first time period. The features may include the features described above that may increase or influence the rate of leaks in a specific area. For example, a rate (or cost) of leaks in the selected network areas may be estimated using historical repair records and/or leak detection methods. Extraction and computation of the features are preferably taken for a time period before the period of the training set. The features may be obtained from enriched GIS data and/or an analysis of a mathematical graph created from the enriched GIS data, created as described above.

In step 705, the utility network is partitioned into regions with fairly uniform characteristics. The characteristics may include, for example, pipe age, length, soil type, number of junctions, etc. A model is generated from the training set, the one or more feature values, and characteristics, step 707. The model may be generated by running a machine-learning black-box to optimize the model's parameters, and to find a model that accurately predicts the leakage rate from the feature values associated with the training set. Various machine-learning approaches may be used to choose a best performing model, such as linear or non-linear regression, decision trees, neural networks, k-nearest neighbor, support vector machines, and other optimization techniques.

Once a model is generated, the model is provided with one or more current or new associated feature values and characteristics, step 709. In a next step 711, predicted leakage or failure rates are obtained for one or more regions from the model. An index may be generated storing network areas and the associated predicted leakage rates. The results of the predicted leakage rates are stored and reported in step 713. The predicted leakage rates may be used by utility companies to prioritize field work or preventive maintenance, possibly after taking into account additional criteria such as the varying cost of work in different areas. Areas or locations with higher leakage or failure rates may be assigned higher priorities for repair.

Another advantageous use of the enriched GIS data generated by the structural analysis engine of the present invention is in developing and implementing step-testing. Step-testing is an analysis technique used for leak detection that involves shutting down or closing off specific parts of a network in sequence to make artificially defined zones and monitoring water flow in and around those parts or zones until a leak is detected or isolated within the specific zone. It is especially useful when acoustic techniques are inapplicable or ineffective, e.g., due to background noise or pipe materials that absorb the leak's noise. More specifically, step-testing may include several steps or phases where, in each step, a different part of a targeted sub-network such as a FMZ is shut down by stopping water supply to that area for a certain length of time by closing one or more valves. Water flow into the FMZ may be monitored during the test and then analyzed. For each step, an expected decrease of flow under normal operating conditions should be proportional to the size of the area that was shut down or, more accurately, the number and size of service connections in the area. If the area includes a leaking pipe, an additional decrease is expected, equal to the leak's magnitude. If an abnormally high decrease is observed in several steps, the leak can be pinpointed to the overlap of the respective areas of the steps. Step-testing is usually carried out at night, when water consumption is low and stable, random variations are minimal, and disruption to consumers is relatively light.

Network traces may also be used to plan for optimal network monitoring operations, such as a step-testing plan. The enriched GIS data or network traces can be used to enhance the calculation of step-testing costs and help determine better locations for future assets. The improvements in step-testing may include, for example, the reduction of valves that need to be open and closed, and a reduction of steps taken. Enriched GIS data can help determine optimal ways to deploy new assets such as meters, sensors, valves, and pipes in a water utility or other type of network to enable optimal future step-testing, when leaks appear.

FIGS. 1 through 7 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

It should also be understood that the invention applies not only to water utility networks, but to any type of distribution system. Other types of distribution systems may be: oil, wastewater or sewage, gas, electric, telephony, heating ventilating and air conditioning (HVAC) systems, or other energy delivery systems which involve fluid or flowing resources from one area to consumers. Indeed, the invention may be applied to any distribution or collection system having meters or sensors at arbitrary locations in the network measuring distribution parameters such as flow, pressure, quality or the flow of data itself.

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computer-implemented method for modeling a utility network, the method comprising:

retrieving geographical information system (GIS) data and asset management data of one or more assets of the utility network, wherein the GIS data and asset management data do not indicate connections between the one or more assets and wherein the GIS data includes coordinate data associated with the one or more assets;

generating, via a processing device, one or more mathematical graph elements from the one or more assets;

creating, via the processing device, probable connections between the one or more mathematical graph elements based on the GIS and asset management data, wherein creating probable connections comprises snapping a plurality of junctions based on coordinate data;

generating, via the processing device, a mathematical graph based on the probable connections, the mathematical graph including one or more asset characteristics of the one or more assets;

analyzing, via the processing device, the determined junctions, wherein analyzing comprises determining if an analyzed junction appears between only two other junctions and merging the two other junctions if the analyzed junction appears between only two other junctions;

identifying, via the processing device and by analyzing the mathematical graph, one or more flow monitoring zones (FMZs) in the utility network, wherein identifying one or more FMZs is based upon analyzing junction locations; and storing the mathematical graph data for use by one or more systems.

2. The method of claim 1, wherein creating probable connections includes creating probable connections based on an analysis of an overlay of a plurality of GIS layers.

3. The method of claim 2, wherein the GIS layers include an asset layer, a pipe layer, and a zone layer.

4. The method of claim 1, wherein the one or more mathematical graph elements includes at least one of nodes, edges, and polygons.

5. The method of claim 1, wherein the mathematical graph includes at least one of a directed graph, undirected graph, mixed graph, multi-graph, simple graph, weighted graph, and Cartesian graph.

6. The method of claim 1, wherein generating the mathematical graph includes at least one of a graphical, geometrical, numerical, differential, functional, and algebraic analysis.

7. The method of claim 1 further comprising determining one or more consumption equations from analysis of the mathematical graph.

8. The method of claim 1, wherein identifying FMZ characteristics includes identifying split FMZs, almost split FMZs, single point of failure, and neighboring FMZs.

9. The method of claim 1 further comprising generating warnings and suggested maintenance recommendations.

10. The method of claim 9, wherein generating warnings and suggested maintenance recommendations comprises presenting one or more physical locations on the mathematical graph.

11. The method of claim 1 further comprising locating optimal meter locations.

12. The method of claim 11, wherein locating optimal meter locations comprises presenting one or more physical locations on the mathematical graph.

13. The method of claim 11, wherein locating optimal meter locations comprises performing balanced cuts on the mathematical graph to partition a flow monitoring zone (FMZ) into sub-areas.

14. The method of claim 11, wherein locating optimal meter locations comprises identifying k-center nodes on the mathematical graph.

15. The method of claim 1, wherein generating a mathematical graph comprises arranging the one or more mathematical graph elements on the mathematical graph based on the created connections.

16. A system for modeling a utility network, the system comprising:

a memory device having executable instructions stored therein; and a processing device, in response to the executable instructions, operative to:

retrieve geographical information system (GIS) data and asset management data of one or more assets of the utility network, wherein the GIS data and asset management data do not indicate connections between the one or more assets and wherein the GIS data includes coordinate data associated with the one or more assets;

generate, via the processing device, one or more mathematical graph elements from the one or more assets;

create, via the processing device, probable connections between the one or more mathematical graph elements based on the GIS and asset management data, wherein creating probable connections comprises snapping a plurality of junctions based on coordinate data;

generate, via the processing device, a mathematical graph based on the probable connections, the mathematical graph including one or more asset characteristics of the one or more assets;

analyze the determined junctions, wherein analyzing comprises determining if an analyzed junction appears between only two other junctions and merging the two other junctions if the analyzed junction appears between only two other junctions;

identify one or more characteristics of one or more flow monitoring zones (FMZs) in the utility network, wherein identifying one or more FMZs is based upon analyzing junction locations; and store the mathematical graph data for use by one or more systems.

17. The system of claim 16, wherein GIS data includes one or more GIS layers.

18. The system of claim 17, wherein the GIS layers include an asset layer, a pipe layer, and a zone layer.

19. The system of claim 16, wherein the one or more mathematical graph elements includes at least one of nodes, edges, and polygons.

20. The system of claim 16, wherein the processing device is further operative to determine one or more consumption equations from analysis of the mathematical graph.

21. The system of claim 16, wherein the processing device is further operative to identify split FMZs, almost split FMZs, single point of failure, and neighboring FMZs.

22. Non-transitory computer readable media comprising program code that when executed by a programmable processor causes execution of a method for modeling a utility network, the computer readable media comprising:

computer program code for retrieving geographical information system (GIS) data and asset management data of one or more assets of the utility network, wherein the GIS data and asset management data do not indicate connections between the one or more assets and wherein the GIS data includes coordinate data associated with the one or more assets;

computer program code for generating, via the processor, one or more mathematical graph elements from the one or more assets;

computer program code for creating, via the processor, probable connections between the one or more mathematical graph elements based on the GIS and asset management data, wherein creating probable connections comprises snapping a plurality of junctions based on coordinate data;

computer program code for generating, via the processor, a mathematical graph based on the probable connections, the mathematical graph including one or more asset characteristics of the one or more assets;

computer program code for analyzing, via the processor, the determined junctions, wherein analyzing comprises determining if an analyzed junction appears between only two other junctions and merging the two other junctions if the analyzed junction appears between only two other junctions;

computer program code for identifying, by analyzing the mathematical graph, one or more flow monitoring zones (FMZs) in the utility network, wherein identifying one or more FMZs is based upon analyzing junction locations; and computer program code for storing the mathematical graph data for use by one or more systems.

23. The computer readable media of claim 22, wherein the computer program code for identifying FMZ characteristics includes computer program code for identifying split FMZs, almost split FMZs, single point of failure, and neighboring FMZs.

24. The computer readable media of claim 22 further comprising computer program code for locating optimal meter locations.

25. The computer readable media of claim 24, wherein the computer program code for locating optimal meter locations further comprises computer program code for performing balanced cuts on the mathematical graph to partition a flow monitoring zone (FMZ) into sub-areas.

26. The computer readable media of claim 24, wherein the computer program code for locating optimal meter locations further comprises computer program code for identifying k-center nodes on the mathematical graph.

27. The computer readable media of claim 22, wherein the computer program code for generating the mathematical graph further comprises program code for arranging the one or more mathematical graph elements on the mathematical graph based on the created connections.

* * * * *